March 13, 1962  E. DES ROCHES  3,024,767

ANTI-CRIBBING DEVICES

Filed Feb. 8, 1960

INVENTOR
EMILE DES ROCHES

Carver and Company
By Hugo Ray
Agent

United States Patent Office 3,024,767
Patented Mar. 13, 1962

3,024,767
ANTI-CRIBBING DEVICES
Emile Des Roches, 4815 Fraser St., Vancouver,
British Columbia, Canada
Filed Feb. 8, 1960, Ser. No. 7,343
4 Claims. (Cl. 119—129)

My invention relates to improvements in anti-cribbing devices.

One of the problems encountered during the training and care of horses is the prevention of a nervous habit known in training circles as cribbing. A cribbing horse is one which bites on a board in his stall or elsewhere, and at the same time sucks in air. The action of biting appears to flex the throat muscles so as to open the throat of the animal's windpipe, whereupon the sucked in air may pass directly to the horse's stomach. Air within the stomach has an adverse effect upon the breathing capacity of a horse, particularly a racehorse, thus cribbing is generally detrimental to the health and condition of a horse.

In order to prevent cribbing it has hitherto been the practise to employ a special strap which is buckled around the upper part of the cribber's neck. Such a neck strap must necessarily apply sufficient pressure to constrict the throat and cause discomfort should the horse attempt to swallow air and for this reason the strap is a constant source of irritation to the animal.

An object of the present invention is to provide a device which is incorporated into a halter and which will effectively put a stop to cribbing without choking or annoying the animal.

A further object is to provide means whereby the required pressure is applied directly to the throat in a manner to prevent air being swallowed, rather than to make it uncomfortable to do so, as is the case with the conventional neck strap.

It has been observed that a horse does not crib with his head lowered substantially to ground level, possibly because the neck muscles cannot readily be flexed in this position, and therefore a further important object of the invention is to provide a device which will automatically loosen when the animal is grazing.

Referring to the accompanying drawings:

FIGURE 1 a side elevational view of the invention in position of use.

In the drawings like characters of reference indicate corresponding parts in each figure.

Figure 1:
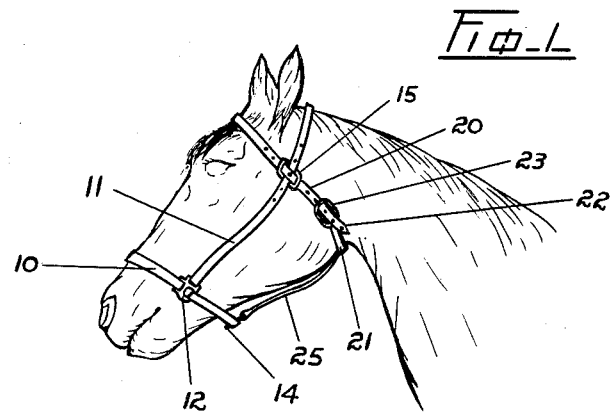
Figure 2:
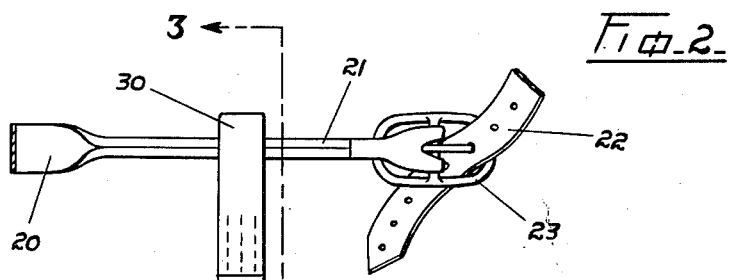
FIGURE 2 is an enlarged plan view of the centre strap with the connected straps being broken away.
Figure 3:
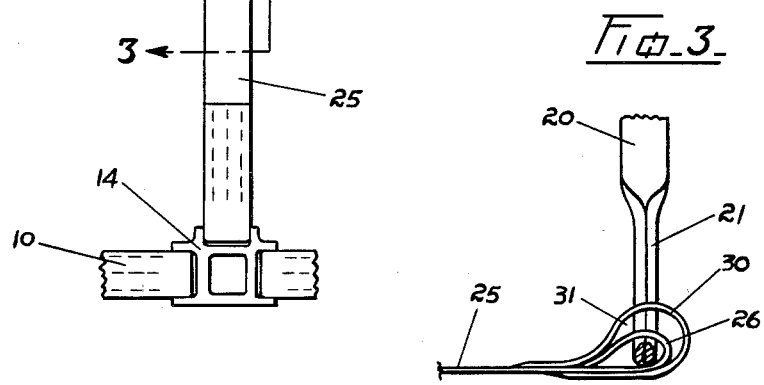
FIGURE 3 is a section taken on the line 3—3 of FIGURE 2.

The halter to which the anti-cribbing device is fitted is shown in FIGURE 1 as being provided with a jaw strap 10 and a cheek strap 11 which are connected together by the usual harness rings 12. The strap 10 encircles the horse's face just above the muzzle and said strap is fitted with a connector 14 which is disposed in a central position beneath the jaws. The cheek strap 11 extends over the head behind the ears and is provided with a pair of spaced clasps 15 which are adjustable lengthwise of the strap.

A throat strap 20 is fitted to the halter which strap is preferably formed of a single strip of leather having ends 21 and 22 connected together by a buckle 23. The strap 20 adjustably extends through both of the clasps 15 and passes over the forehead and across the throat immediately above the jaws. The end 21 of the throat strap may be formed into a substantially oval shaped portion which is positioned directly below the horse's throat.

Secured to the connector 14 carried by the jaw strap 10 is a centre strap 25 which is adapted to extend upwardly in close proximity to the underside of the jaws and in a centrally disposed position. One end of the centre strap 25 is provided with an eye 26 and slidably extending through said eye is the oval shaped end 21 of the throat strap. It will be noted that the connector 14 will permit the centre strap to swing in a vertical plane when in position of use but that very little transverse movement of the eyed end 26 can take place.

A pressure member 30 is secured to the eye 26 of the centre strap and this member preferably is in the form of a length of leather which is sewn to the centre strap end to define a more or less circular loop 31 having a diameter considerably greater than that of the eye 26. Since the loop 31 is fairly easily distorted by force applied thereto in a radial direction the member 30 will exert a cushioned or a limited amount of pressure on the part of the horse's throat to which it is clamped.

A cribbing horse is fitted with the halter and the strap 20 is suitably adjusted to draw the pressure member 30 into contact with the throat of the windpipe. As previously stated this clamping pressure is not great but should the horse attempt to crib while that pressure is applied, it will find difficulty in manipulating the throat muscles so as to be able to draw air into the stomach.

When the horse's head is lowered and extended to graze, the movement of the head into substantial alignment with the neck swings the pressure member 30 out of contact with the throat and the animal is then able to feed without discomfort. The clamping pressure is again applied when the animal raises his head and at all times device has the appearance and function of a normal halter.

What I claim as my invention is:

1. In a horse's halter having a jaw strap and a cheek strap, an anti-cribbing device comprising a throat strap secured to the cheek strap and adapted to extend around a horse's head above the jaws, a center strap secured at one end to the jaw strap and having a connecting eye at the opposite end through which the throat strap slidably extends, a pressure loop of greater diameter than and surrounding the connecting eye of the center strap and means for adjusting the throat strap whereby to urge the pressure loop into gripping engagement with a horse's throat.

2. An anti-cribbing device as claimed in claim 1, wherein the center strap has an overall length less than the distance on a horse's head between the throat strap and the jaw strap when the horse's head is in an elevated position.

3. An anti-cribbing device as claimed in claim 1, wherein the pressure loop is a flexible member capable of being flexed mainly in a radial direction.

4. An anti-cribbing device as claimed in claim 1 and means for adjusting the throat strap lengthwise of the cheek strap.

References Cited in the file of this patent
UNITED STATES PATENTS
1,773,774    Carr _____ Aug. 26, 1930
FOREIGN PATENTS
71,684    Sweden _____ Apr. 21, 1931